United States Patent
Deshmukh et al.

(10) Patent No.: US 10,547,070 B2
(45) Date of Patent: Jan. 28, 2020

(54) STL ACTUATION-PATH PLANNING

(71) Applicant: Toyota Motor Engineering & Manufacturing North America, Inc., Plano, TX (US)

(72) Inventors: Jyotirmoy V. Deshmukh, Torrance, CA (US); Xiaoqing Jin, Torrance, CA (US); Jared Farnsworth, Roseville, CA (US); Shigeki Hasegawa, Aichi (JP)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 97 days.

(21) Appl. No.: 15/917,447

(22) Filed: Mar. 9, 2018

(65) Prior Publication Data
US 2019/0280319 A1 Sep. 12, 2019

(51) Int. Cl.
| | |
|---|---|
| *H01M 8/04298* | (2016.01) |
| *H01M 8/04746* | (2016.01) |
| *B60L 3/12* | (2006.01) |
| *B60L 11/18* | (2006.01) |
| *B60L 3/00* | (2019.01) |
| *B60L 58/30* | (2019.01) |

(52) U.S. Cl.
CPC ....... *H01M 8/04305* (2013.01); *B60L 3/0053* (2013.01); *B60L 3/12* (2013.01); *B60L 58/30* (2019.02); *H01M 8/04753* (2013.01); *H01M 2250/20* (2013.01)

(58) Field of Classification Search
CPC .................................................. H01M 8/04305
See application file for complete search history.

(56) References Cited

U.S. PATENT DOCUMENTS

| | | | |
|---|---|---|---|
| 6,442,455 B1 | 8/2002 | Kotre et al. | |
| 6,480,767 B2 | 11/2002 | Yamaguchi et al. | |
| 6,635,374 B1 | 10/2003 | Aramaki | |
| 6,847,188 B2 | 1/2005 | Keskula et al. | |
| 6,924,050 B2 | 8/2005 | Lahiff | |
| 6,936,359 B2 | 8/2005 | Kobayashi et al. | |

(Continued)

FOREIGN PATENT DOCUMENTS

| | | |
|---|---|---|
| CN | 202065044 | 12/2011 |
| CN | 202930480 | 5/2013 |

(Continued)

*Primary Examiner* — Todd M Melton
(74) *Attorney, Agent, or Firm* — Snell & Wilmer LLP

(57) ABSTRACT

A system for determining desired control paths for controlling operation of a fuel cell circuit includes a memory to store a model of the fuel cell circuit and an input device to receive system requirements. The system also includes a model processor designed to select sets of time-series actuator states corresponding to time-series control of an actuator of the fuel cell circuit and to perform simulations of the model using the multiple sets of time-series actuator states as controls for the actuator. The model processor is also performs an analysis of results of the simulations to determine whether the results for each of the multiple sets of time-series actuator states satisfy the system requirements and how far the results are from the system requirements, and selects a final set of time-series actuator states that satisfy the system requirements based on the analysis.

20 Claims, 9 Drawing Sheets

(56) References Cited

U.S. PATENT DOCUMENTS

| | | |
|---|---|---|
| 7,117,078 B1 | 10/2006 | Gangopadhyay |
| 7,124,040 B2 | 10/2006 | Engelhardt et al. |
| 7,141,326 B2 | 11/2006 | Kobayashi et al. |
| 7,247,401 B2 | 7/2007 | Aberle et al. |
| 7,348,082 B2 | 3/2008 | Kolodziej |
| 7,353,900 B2 | 4/2008 | Abe et al. |
| 7,608,011 B2 | 10/2009 | Grabowski et al. |
| 7,612,532 B2 | 11/2009 | Verbrugge |
| 7,682,717 B2 | 3/2010 | Ueda et al. |
| 7,682,719 B2 | 3/2010 | Lienkamp et al. |
| 7,687,164 B2 | 3/2010 | Frost et al. |
| 7,845,187 B2 | 12/2010 | Patel et al. |
| 7,919,211 B2 | 4/2011 | Nonobe et al. |
| 8,044,534 B2 | 10/2011 | Kojima et al. |
| 8,141,356 B2 | 3/2012 | Leone et al. |
| 8,153,321 B2 | 4/2012 | Katano |
| 8,215,428 B2 | 7/2012 | Lee et al. |
| 8,293,413 B2 | 10/2012 | Bono |
| 8,342,275 B2 | 1/2013 | Ojima et al. |
| 8,394,542 B2 | 3/2013 | Elwart et al. |
| 8,486,574 B2 | 7/2013 | Jenings |
| 8,498,766 B2 | 7/2013 | Takahashi et al. |
| 8,561,453 B2 | 10/2013 | Hobmeyr et al. |
| 8,568,935 B2 | 10/2013 | Arthur et al. |
| 8,673,515 B2 | 3/2014 | Harris et al. |
| 8,684,117 B2 | 4/2014 | Ptacek et al. |
| 8,691,456 B2 | 4/2014 | Choe et al. |
| 8,715,875 B2 | 5/2014 | Chan et al. |
| 8,722,263 B2 | 5/2014 | Cai et al. |
| 8,754,392 B2 | 6/2014 | Caimi et al. |
| 8,757,223 B2 | 6/2014 | Uemura |
| 8,796,984 B2 | 8/2014 | Yoshida et al. |
| 8,846,262 B2 | 9/2014 | Mussro et al. |
| 8,920,995 B2 | 12/2014 | Lebzelter et al. |
| 8,935,029 B2 | 1/2015 | Sabrie et al. |
| 8,951,685 B2 | 2/2015 | Aso et al. |
| 8,956,778 B2 | 2/2015 | Zhang et al. |
| 8,962,208 B2 | 2/2015 | Mussro et al. |
| 8,986,899 B2 | 3/2015 | Harris et al. |
| 8,997,771 B2 | 4/2015 | Lee et al. |
| 9,002,568 B2 | 4/2015 | Datta et al. |
| 9,005,785 B2 | 4/2015 | Alp et al. |
| 9,021,824 B2 | 5/2015 | Koo et al. |
| 9,099,701 B2 | 8/2015 | Maslyn et al. |
| 9,187,009 B2 | 11/2015 | Jeon et al. |
| 9,242,532 B2 | 1/2016 | Kim et al. |
| 9,242,573 B2 | 1/2016 | Lee et al. |
| 9,281,532 B2 | 3/2016 | Lebzelter et al. |
| 9,281,533 B2 | 3/2016 | Ozawa et al. |
| 9,312,549 B2 | 4/2016 | Tachibana et al. |
| 9,318,778 B2 | 4/2016 | Wahlstrom et al. |
| 9,358,900 B2 | 6/2016 | Wake et al. |
| 9,437,884 B2 | 9/2016 | Kolodziej |
| 9,457,640 B2 | 10/2016 | Ikeya |
| 9,472,818 B2 | 10/2016 | Kilmer |
| 9,527,404 B2 | 12/2016 | Gauthier et al. |
| 9,531,019 B2 | 12/2016 | Jeon |
| 9,590,259 B2 | 3/2017 | Toida |
| 9,614,236 B2 | 4/2017 | Yu et al. |
| 9,620,796 B2 | 4/2017 | Tomita et al. |
| 9,620,799 B2 | 4/2017 | Igarashi et al. |
| 9,643,517 B2 | 5/2017 | Watanabe et al. |
| 10,290,884 B2 * | 5/2019 | Chen .............. H01M 8/04604 |
| 2003/0105562 A1 | 6/2003 | Hsiao et al. |
| 2004/0018399 A1 | 1/2004 | Jung |
| 2006/0134472 A1 | 6/2006 | Bach et al. |
| 2008/0286622 A1 | 11/2008 | Shaw et al. |
| 2009/0050082 A1 | 2/2009 | Iwasaki |
| 2011/0214930 A1 | 9/2011 | Betts et al. |
| 2012/0129059 A1 | 5/2012 | Ohashi |
| 2014/0000859 A1 | 1/2014 | Abihana |
| 2014/0000862 A1 | 1/2014 | Abihana et al. |
| 2014/0103128 A1 | 4/2014 | Patel et al. |
| 2014/0120440 A1 | 5/2014 | Nolan et al. |
| 2014/0335432 A1 | 11/2014 | Sinha et al. |
| 2014/0342253 A1 | 11/2014 | Lee et al. |
| 2014/0370412 A1 | 12/2014 | Sumser et al. |
| 2015/0188157 A1 | 7/2015 | Na et al. |
| 2016/0006049 A1 | 1/2016 | Kwon et al. |
| 2016/0137096 A1 | 5/2016 | Oda et al. |
| 2016/0141645 A1 | 5/2016 | Yamada et al. |
| 2016/0141661 A1 | 5/2016 | Kim et al. |
| 2016/0141666 A1 | 5/2016 | Shim et al. |
| 2016/0153367 A1 | 6/2016 | Yoon |
| 2016/0172696 A1 | 6/2016 | Milacic et al. |
| 2016/0211536 A1 | 7/2016 | Kwon et al. |
| 2016/0336607 A1 | 11/2016 | Lee et al. |
| 2016/0359181 A1 | 12/2016 | Lee |
| 2016/0372768 A1 | 12/2016 | Proctor et al. |
| 2017/0012310 A1 | 1/2017 | Han et al. |
| 2017/0047603 A1 | 2/2017 | Kazuno |
| 2017/0092972 A1 | 3/2017 | Pence |
| 2017/0162885 A1 | 6/2017 | Kim |
| 2017/0179511 A1 | 6/2017 | Jung et al. |

FOREIGN PATENT DOCUMENTS

| | | |
|---|---|---|
| CN | 105895941 | 8/2016 |
| DE | 102012224052 | 6/2014 |
| GB | 2533015 | 6/2016 |
| JP | 2005347008 | 12/2005 |
| KR | 100863649 | 10/2008 |
| WO | WO2005078257 | 8/2005 |
| WO | WO2013073457 | 5/2013 |

* cited by examiner

STL ACTUATION-PATH PLANNING

BACKGROUND

1. Field

The present disclosure relates to systems and methods for identifying control paths of multiple actuators of a fuel cell circuit to achieve desirable pressure and flow values throughout the fuel cell circuit.

2. Description of the Related Art

Fuel cells are becoming more popular for us as power sources in vehicles. Fuel cells may receive hydrogen along with an oxidizer, such as air, and may facilitate a reaction between the hydrogen and the oxidizer to create electricity. Power generation of the fuel cells may vary based on a power request by a driver. For example, if a driver depresses the accelerator pedal then it is desirable for the fuel cells to generate more power than if no acceleration is requested. It is desirable to control a flow of air and a pressure within the fuel cells based on how much power will be generated by the fuel cells. For example, if insufficient air is provided to the fuel cells then the fuel cells may undesirably dry out, resulting in potentially irreversible damage to the fuel cells.

A fuel cell circuit may include multiple actuators, including a compressor, for providing the air to the fuel cells. The compressor may direct the air through the fuel cell circuit towards the fuel cells. It is desirable to control airflow through and pressure ratio across the compressor to prevent the compressor from entering into a surge or other undesirable condition.

It may be relatively difficult to control the actuators in such a way as to always satisfy the requirements of the compressor and the fuel cell stack. In that regard, systems and methods for identifying time-series control of actuators of the fuel cell circuit to satisfy the pressure and flow limitations are desirable.

SUMMARY

Described herein is a system for determining desired control paths for controlling operation of a fuel cell circuit. The system includes a memory designed to store a model of the fuel cell circuit including at least one actuator and a fuel cell stack. The system also includes an input device designed to receive system requirements corresponding to desirable operation of the fuel cell circuit. The system also includes an output device designed to output data. The system also includes a model processor coupled to the memory, the input device, and the output device. The model processor is designed to select multiple sets of time-series actuator states corresponding to time-series control of the at least one actuator of the fuel cell circuit. The model processor is also designed to perform simulations of the model using the multiple sets of time-series actuator states as controls for the at least one actuator. The model processor is also designed to perform an analysis of results of the simulations to determine whether the results for each of the multiple sets of time-series actuator states satisfy the system requirements and how far the results are from the system requirements. The model processor is also designed to select a final set of time-series actuator states that satisfy the system requirements based on the analysis of the results. The model processor is also designed to control the output device to output the final set of time-series actuator states.

Also described is a system for determining desired control paths for controlling operation of a fuel cell circuit. The system includes a memory designed to store a model of the fuel cell circuit including at least one actuator and a fuel cell stack. The system also includes an input device configured to receive system requirements corresponding to desirable operation of the fuel cell circuit. The system also includes a model processor coupled to the memory and the input device. The model processor is designed to select multiple sets of time-series actuator states corresponding to time-series control of the at least one actuator of the fuel cell circuit. The model processor is also designed to perform simulations of the model using the multiple sets of time-series actuator states as controls for the at least one actuator. The model processor is also designed to perform an analysis of results of the simulations to determine robustness values for each of the simulations indicating whether the results for each of the multiple sets of time-series actuator states satisfy the system requirements and how far the results are from the system requirements. A robustness value may refer to an estimated signed distance of a given time-series of actuator states from the set of time-series actuator states that satisfy a quantitative requirement. The model processor is also designed to select a final set of time-series actuator states that satisfy the system requirements based on the robustness values.

Also described is a method for determining desired control paths for controlling operation of a fuel cell circuit. The method includes storing, in a memory, a model of the fuel cell circuit including at least one actuator and a fuel cell stack. The method also includes receiving, by an input device, system requirements corresponding to desirable operation of the fuel cell circuit. The method also includes selecting, by a model processor, multiple sets of time-series actuator states corresponding to time-series control of the at least one actuator of the fuel cell circuit. The method also includes performing, by the model processor, simulations of the model using the multiple sets of time-series actuator states as controls for the at least one actuator. The method also includes performing, by the model processor, an analysis of results of the simulations to determine whether the results for each of the multiple sets of time-series actuator states satisfy the system requirements and how far the results are from the system requirements. The method also includes selecting, by the model processor, a final set of time-series actuator states that satisfy the system requirements based on the analysis of the results.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for identifying desirable time-series control paths for actuators of a fuel cell circuit. The systems and methods provide several benefits and advantages such as determining synchronous time-series control of multiple actuators over a period of time. This advantageously allows for control of the actuators in such a way as to cause all pressure and flow values of air through the fuel cell circuit to change states in a desired pattern, which reduces the likelihood of undesirable effects such as damage to components of the fuel cell circuit. The systems provide additional advantages such as determining the time-series control using a model of the physical fuel cell circuit in order to ensure that the fuel cell circuit is physically capable of performing the control paths identified by the systems. The systems advantageously use a falsification technique to rank potential time-series control solutions such that an optimal solution can be selected based on the ranking.

An exemplary system includes a memory that stores a physics based model of the fuel cell circuit, along with an input device that receives system requirements that indicate desirable operation of the fuel cell circuit. A model processor can select new sets of time-series actuator states corresponding to time-series control of multiple actuators and perform simulation using the model and each of the newly-selected time-series actuator states. The model processor can then compare results of the simulations to the system requirements and determine whether the requirements are satisfied and how far the results lie from the requirements. The model processor may then select a final set of time-series actuator states that best satisfies the system requirements based on the comparison.

Figure 1:
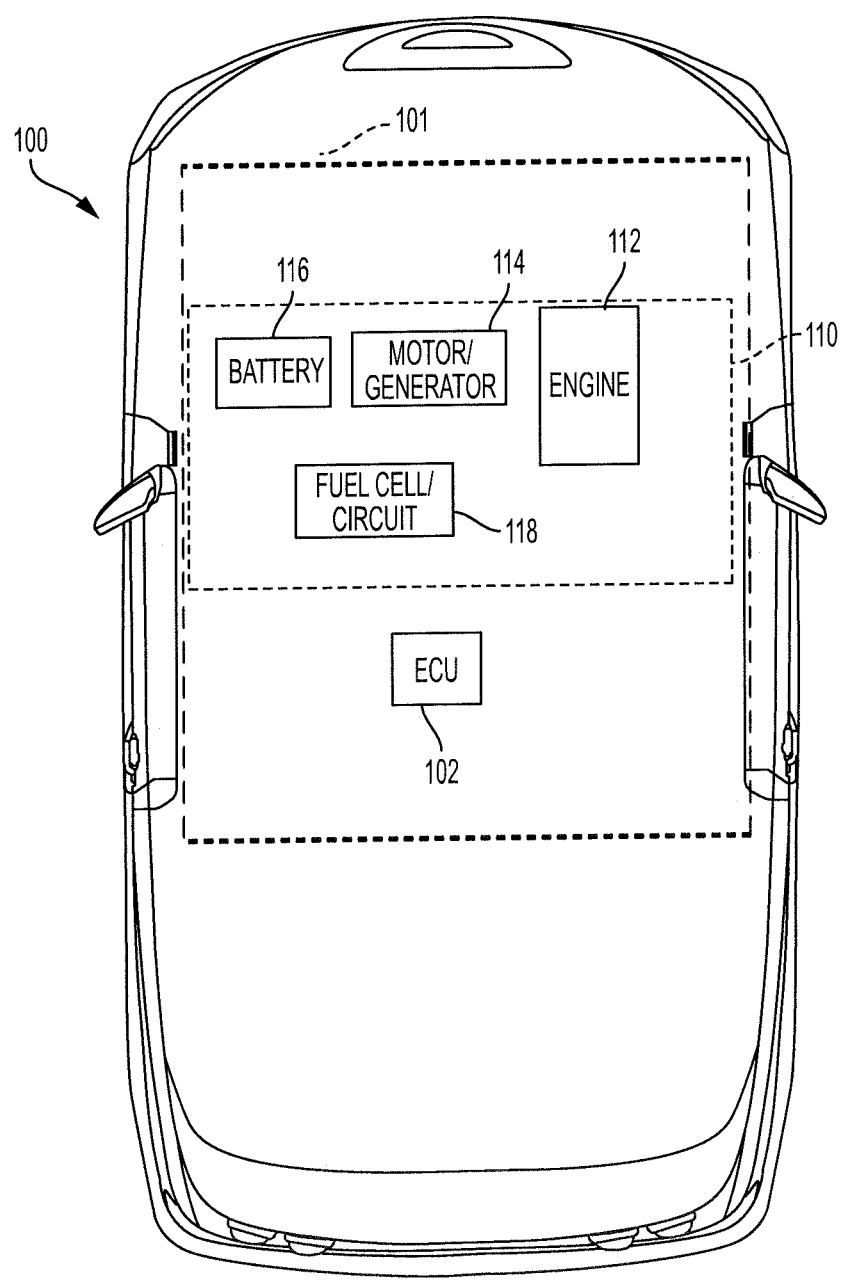
FIG. 1 is a block diagram illustrating a vehicle that includes a fuel cell circuit as a power source of the vehicle according to an embodiment of the present invention.

Turning to FIG. 1, a vehicle 100 includes components of a system 101 for providing gas, such as air, to fuel cells. In particular, the vehicle 100 and system 101 include an ECU 102 and a power source 110 which may include at least one of an engine 112, a motor-generator 114, a battery 116, or a fuel cell circuit 118. The fuel cell circuit 118 may be a part of the system 101.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operation of components based on the determinations.

In some embodiments, the vehicle 100 may be fully autonomous or semi-autonomous. In that regard, the ECU 102 may control various aspects of the vehicle 100 (such as steering, braking, accelerating, or the like) to maneuver the vehicle 100 from a starting location to a destination.

The engine 112 may convert a fuel into mechanical power. In that regard, the engine 112 may be a gasoline engine, a diesel engine, or the like.

The battery 116 may store electrical energy. In some embodiments, the battery 116 may include any one or more energy storage device including a battery, a fly-wheel, a super-capacitor, a thermal storage device, or the like.

The fuel cell circuit 118 may include a plurality of fuel cells that facilitate a chemical reaction to generate electrical energy. For example, the fuel cells may receive hydrogen and oxygen, facilitate a reaction between the hydrogen and oxygen, and output electricity in response to the reaction. In that regard, the electrical energy generated by the fuel cell circuit 118 may be stored in the battery 116. In some embodiments, the vehicle 100 may include multiple fuel cell circuits including the fuel cell circuit 118.

The motor-generator 114 may convert the electrical energy stored in the battery (or electrical energy received directly from the fuel cell circuit 118) into mechanical power usable to propel the vehicle 100. The motor-generator 114 may further convert mechanical power received from the engine 112 or wheels of the vehicle 100 into electricity, which may be stored in the battery 116 as energy and/or used by other components of the vehicle 100. In some embodiments, the motor-generator 114 may also or instead include a turbine or other device capable of generating thrust.

Figure 2:
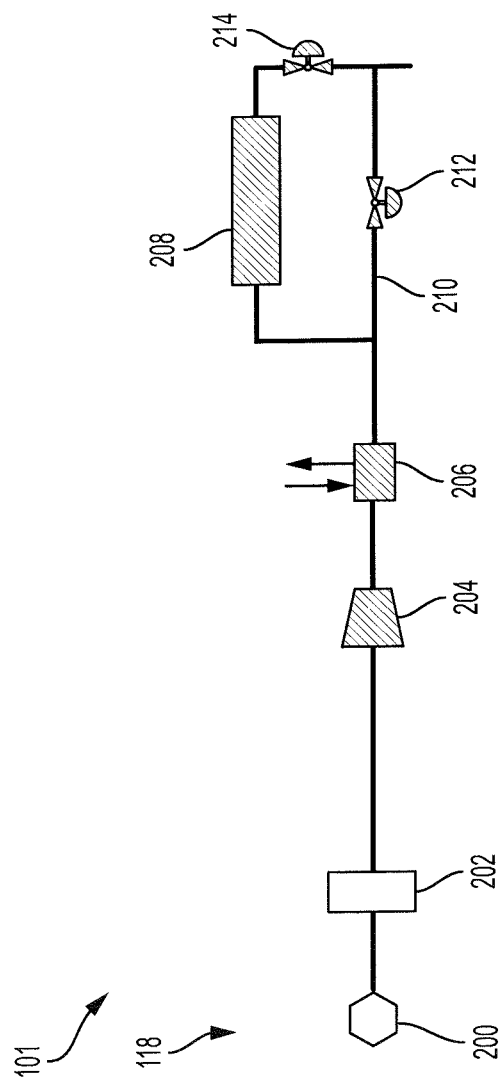
FIG. 2 is a block diagram of the fuel cell circuit of FIG. 1 according to an embodiment of the present invention.

Turning now to FIG. 2, additional details of the fuel cell circuit 118 are illustrated. In particular, the fuel cell circuit 118 includes an air intake 200, an air cleaner 202, a compressor 204, an intercooler 206, a fuel cell stack 208, a bypass branch 210, a bypass valve 212 positioned along the bypass branch 210, and a restriction valve 214.

The air intake 200 may receive air from an ambient environment, such as outside of the vehicle 100 of FIG. 1.

The compressor 204 may be a turbo compressor or other compressor capable of pressurizing air. In that regard, the compressor 204 may draw air from the air cleaner 202 and may output pressurized air.

The intercooler 206 may receive the air from the compressor 204 and may also receive a fluid, such as a coolant. The intercooler 206 may transfer heat from the air to the coolant, or may transfer heat from the coolant to the air. In that regard, the intercooler 206 may adjust a temperature of the air flowing through the fuel cell circuit 118.

The fuel cell stack 208 may include a plurality of fuel cells. The fuel cells may receive hydrogen along with the air from the intercooler 206. The fuel cells may facilitate a chemical reaction between the oxygen in the air and the hydrogen, which may generate electricity.

The air from the intercooler 206 may be split such that some of the air flows through the fuel cell stack 208 and some of the air flows through the bypass branch 210. In that regard, the air flowing through the bypass branch 210 fails to flow through the fuel cell stack 208. The bypass valve 212 may have an adjustable valve position. The adjustable valve position of the bypass valve 212 may be controlled to adjust an amount of airflow through the bypass branch 210 and, likewise, to adjust an amount of airflow through the fuel cell stack 208. For example, when the bypass valve 212 is 100 percent (100%) closed then all of the airflow through the fuel cell circuit 118 flows through the fuel cell stack 208 and none through the bypass branch 210.

The restriction valve 214 may likewise have an adjustable valve position. The adjustable valve position of the restriction valve 214 may be controlled to adjust a pressure of the air within the fuel cell stack 208. For example, the pressure within the fuel cell stack 208 may be increased by closing the restriction valve 214, and may be decreased by opening the restriction valve 214.

Referring to FIGS. 1 and 2, each of the compressor 204, the bypass valve 212, and the restriction valve 214 may be considered actuators and may be controlled by the ECU 102. For example, the ECU 102 may receive a power request from a driver of the vehicle (or may generate a power request in an autonomous or semi-autonomous vehicle). The ECU 102 may convert the power request into desirable pressure or flow values corresponding to desirable pressure or airflow at specific locations within the fuel cell circuit 118. The ECU 102 may then control each of the compressor 204, the bypass valve 212, and the restriction valve 214 in order to achieve the desirable pressure or flow values.

Control of the actuators of the fuel cell circuit 118 may be relatively complex. This is due to the fact that a change in actuator position of one actuator can affect all pressure and flow values throughout the fuel cell circuit 118. For example, a change in position of the restriction valve 214 may affect flow rates and pressures throughout each component of the fuel cell circuit 118.

In that regard, the ECU 102 may be designed to control each of the actuators simultaneously using time-series control logic. Such control causes the pressure and flow values throughout the fuel cell circuit 118 to follow a desirable path from a starting state to a final state. For example, the ECU 102 may receive a target pressure ratio across the compressor 204 and a target mass flow through the compressor 204. The ECU 102 may control the compressor 204, the bypass valve 212, and the restriction valve 214 based on the desirable path in order to cause a current pressure ratio and a current flow through the compressor 204 to reach the target pressure ratio and target flow.

The desirable paths may be selected in order to satisfy various requirements of the fuel cell circuit 118. For example, requirements may include such limitations as preventing or reducing the likelihood of the compressor 204 reaching a surge state or a stall state, reducing overshoot of certain pressure and flow values throughout the fuel cell circuit 118, and the like.

Figure 3:
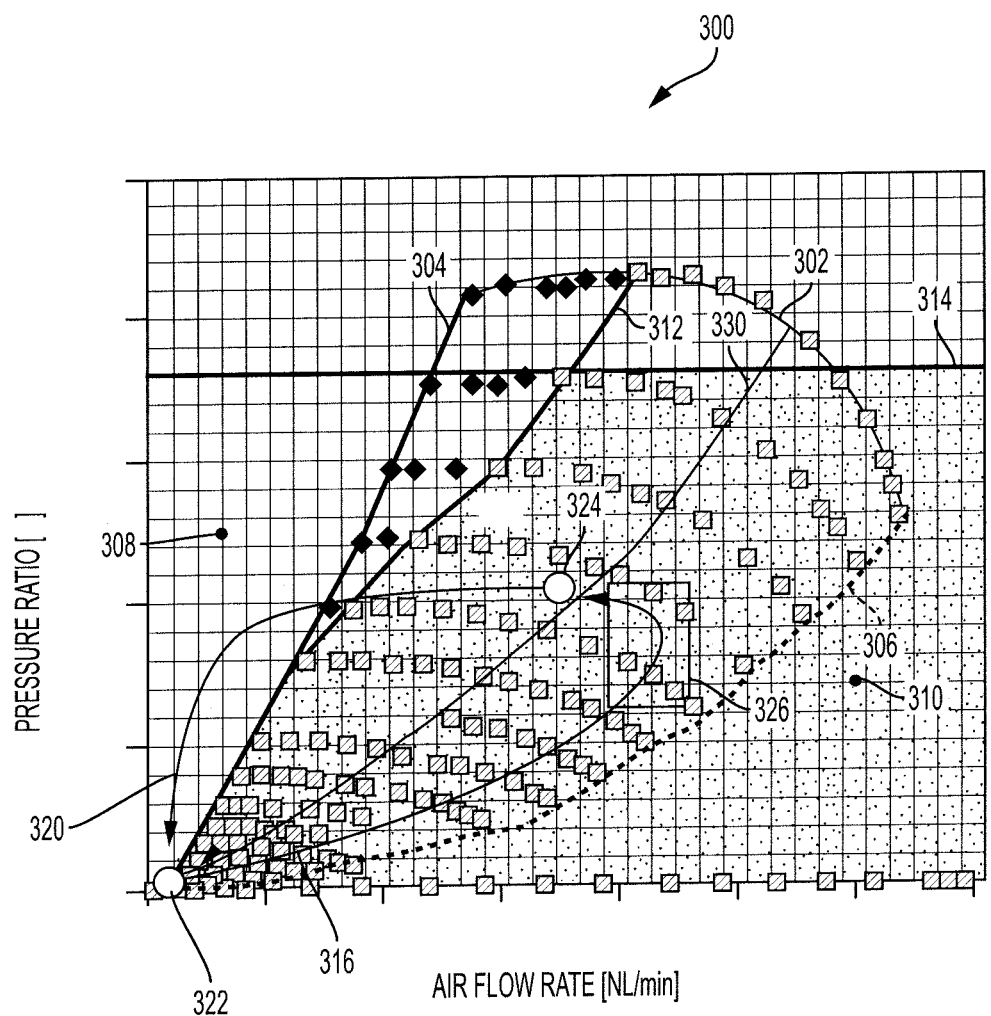
FIG. 3 is a speed map illustrating operational parameters of a compressor of the fuel cell circuit of FIG. 2 according to an embodiment of the present invention.

Turning to FIG. 3, a speed map 300 illustrates the relationship between pressure ratio, airflow rate, and compressor speed of the compressor 204 of FIG. 2. The speed map 300 plots airflow rate through the compressor (the X axis), pressure ratio across the compressor (the Y axis), and includes multiple speed lines 302 that correspond to speeds of the compressor.

The speed map 300 includes a surge line 304 and a stall line 306. Operation of the compressor outside of the surge line 304 (such as at a location 308) results in a surge condition experienced by the compressor. Operation of the compressor outside of the stall line 306 (such as at a location 310) results in a stall condition experienced by the compressor. The stall condition and the surge condition are both undesirable.

The speed map 300 further includes a zero-slope line 312 and an over-boost line 314. Operation of the compressor between the surge line 304 and the zero-slope line 312 may result in a surge like condition experienced by the compressor, which is undesirable. The over-boost line 314 corresponds to a maximum pressure ratio beyond which it is undesirable to operate the compressor.

The speed map 300 further illustrates a system on-path 316 and a compressor off-path 320. Referring now to FIGS. 2 and 3, the system on-path 316 illustrates exemplary control of the compressor 204 from a starting state 322 to a final or target state 324. The phrase "on-path" may refer to a path taken by the compressor 204 in response to a driver command resulting in an increased power request, and may result in the compressor 204 increasing in pressure ratio, airflow rate, and speed. The phrase "off-path" may refer to a path taken by the compressor 204 in response to a driver command resulting in a decreased power request, and may result in the compressor 204 decreasing in pressure ratio, airflow rate, and speed. The speed map 300 only includes the system on-path 316 (as opposed to a compressor on-path and a fuel cell on-path) because the bypass valve 212 is typically closed during an on condition. This results in the flow values through the fuel cell stack 208 being equivalent to the flow values through the compressor 204.

The system on-path 316 illustrates exemplary conditions experienced by the compressor from the starting state 322 to the target state 324. As shown, an undesirable overshoot 326 is experienced during the system on-path 316. Overshoot refers to the fact that the airflow rate through the compressor 204 exceeds the target state 324 before returning to and settling at the target state 324. As shown, an overshoot of approximately 700 Normal Liters per minute is experienced during the on-path 316.

The compressor off-path 320 illustrates exemplary conditions experienced by the compressor 204 from the target state 324 back to the starting state 322. The fuel cell off-path 320 illustrates exemplary conditions experienced by the fuel cell stack 208 from the target state 324 back to the starting state 322. As shown in this example, the fuel cell off-path 320 undesirably crosses the surge line 304. In that regard, it is desirable to control the actuators of the fuel cell circuit 118 to avoid the overshoot 326 as well as the surge of the fuel cell off-path 320.

Figure 4:
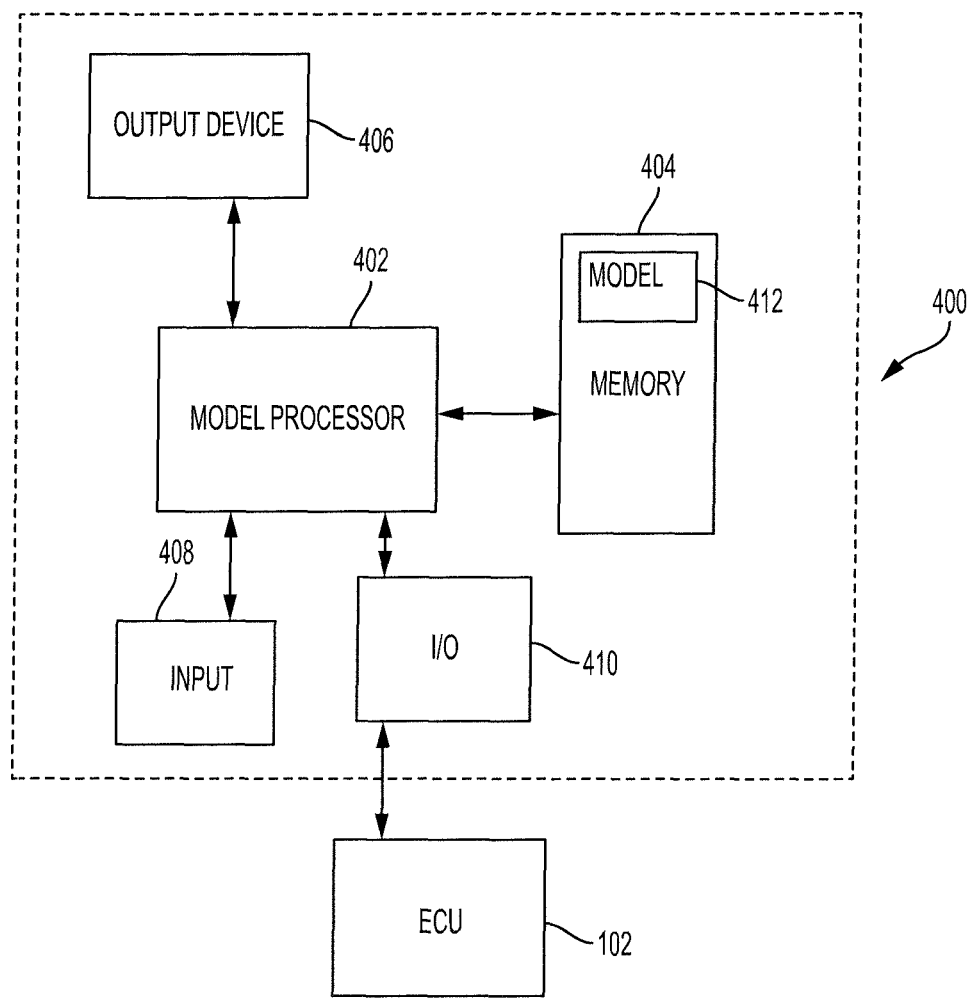
FIG. 4 is a block diagram of a system for determining desired control paths for controlling operation of the actuators of the fuel cell circuit of FIG. 2 according to an embodiment of the present invention.

Turning now to FIG. 4, a system 400 for determining desired control paths of the actuators of the fuel cell circuit 118 of FIG. 2 is shown. The system 400 includes a model processor 402, a memory 404, an output device 406, an input device 408, and an input/output (I/O) port 410.

The model processor 402 may be a computer processor such as an ARM processor, DSP processor, distributed processor or other form of central processing. The model processor 402 may be adapted to run machine-readable instructions. In particular, the model processor 402 may be adapted to run simulations using a model 412 of the fuel cell circuit in order to identify desirable control paths of the actuators.

The model processor 402 may be electrically coupled to the memory 404. The memory 404 may be a non-transitory memory or data storage device, such as a hard disk drive, a solid-state disk drive, a hybrid disk drive, or other appropriate data storage. The memory 404 may further store the model 412 of the fuel cell circuit. The memory 404 may also, in some embodiments, store input and output signals of the actuators for later analysis by the model processor 402.

The output device 406 may include any device or port capable of outputting data to a person or to another machine.

For example, the output device 406 may include a display, a speaker, a touchscreen, or the like.

The input device 408 may include any device or port capable of receiving data from a person or from another machine. For example, the input device 408 may include a microphone, a keyboard, a touchscreen, or the like.

The I/O port 410 may include any port or device capable of communicating the remote device. For example, the I/O port 410 may include a port capable of communicating via any IEEE 802.11 protocol (e.g., a Wi-Fi port), a Bluetooth port, a serial port, or the like. In that regard, the I/O port 410 may be considered an input device (when data is received via the I/O port 410) and/or an output device (when data is output via the I/O port 410).

As mentioned above, the model processor 402 may perform simulations using the model 412 to identify desired control paths for each of the actuators of the fuel cell circuit. In some embodiments, the model processor 402 may control the output device 406 to output the desired control paths upon their identification. In some embodiments, the model processor may provide the desired control paths to the ECU 102 via the I/O port 410. In that regard, the ECU 102 may control the actuators of the fuel cell circuit to follow the desired control paths.

Referring to FIGS. 3 and 4, the model processor 402 may identify multiple desired on-paths and multiple desired off-paths. For example, the model processor 402 may identify a first on-path along the stall line 306, a second on-path along the surge line 304, and a third on-path along a midline 330 that is located between the stall line 306 and the surge line 304. The model processor 402 may further identify the first off-path along the stall line 306, a second off-path along the surge line 304, and a third off-path along the midline 330.

Figure 5A:
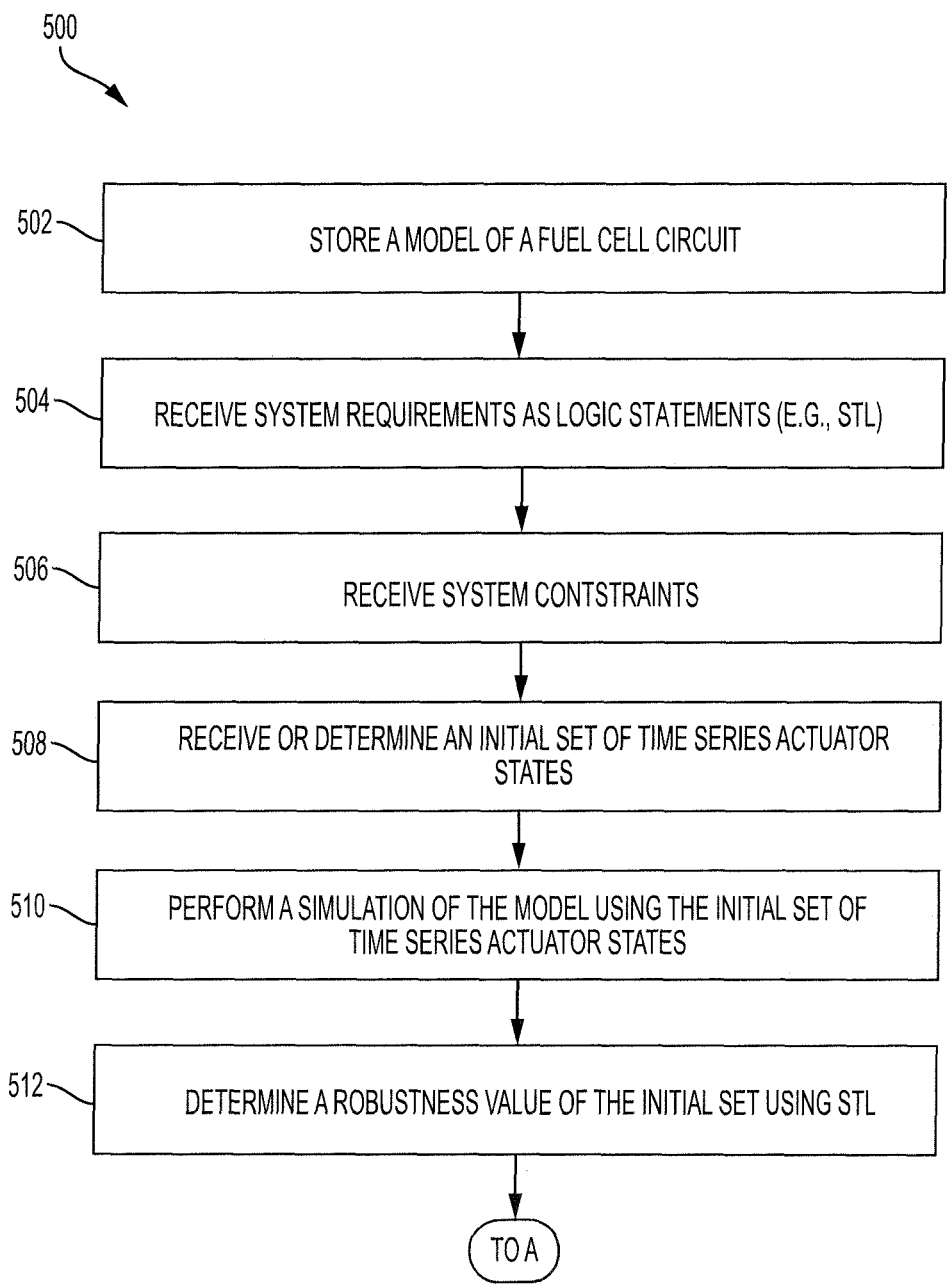
FIGS. 5A and 5B are flowcharts illustrating a method for controlling operation of the actuators of the fuel cell circuit of FIG. 2 according to an embodiment of the present invention.
Figure 5B:
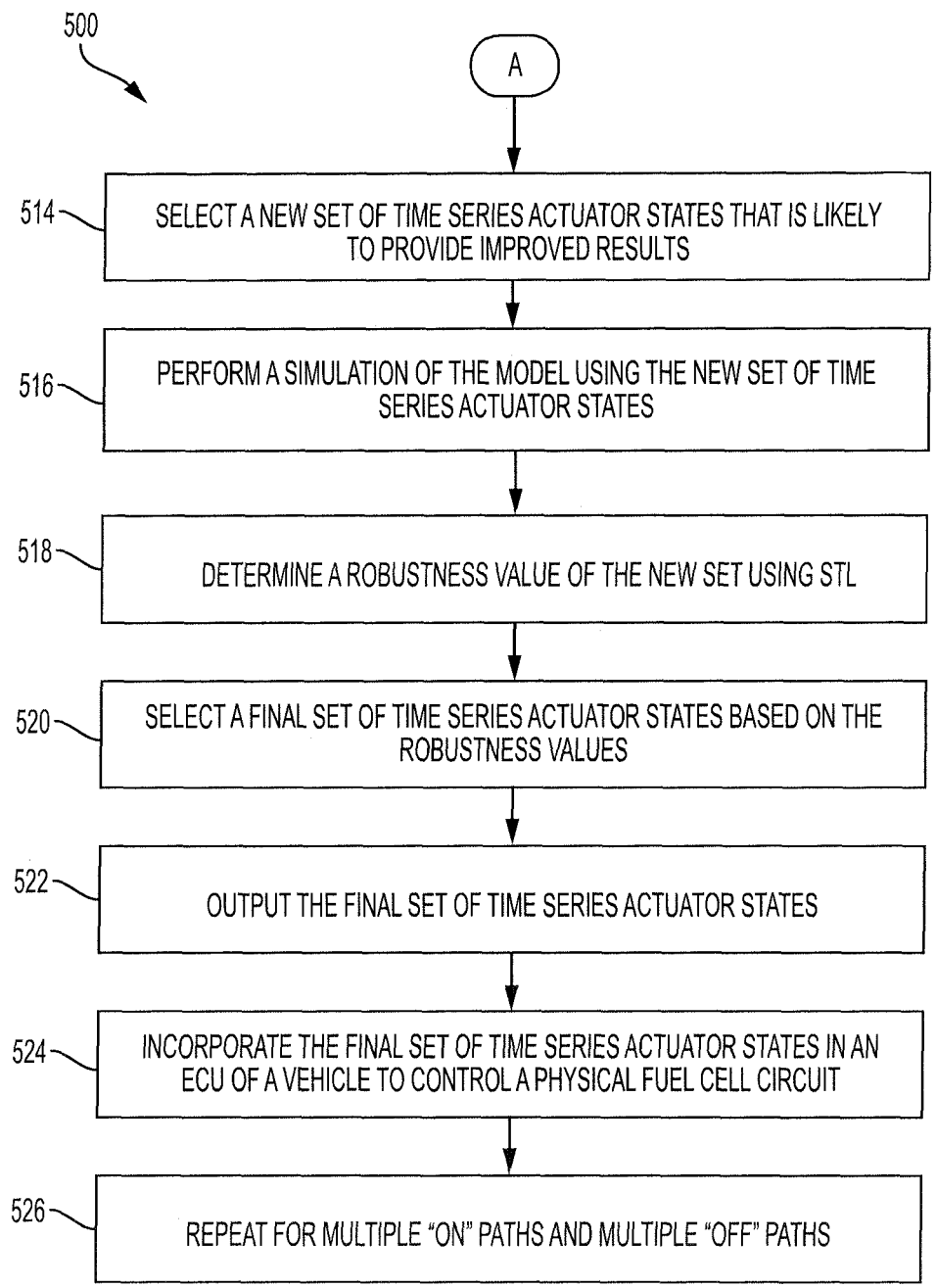

Turning now to FIGS. 5A and 5B, a method 500 for determining desired control paths for controlling the actuators of a fuel cell circuit is shown. The method 500 may be performed by components of a system similar to the system 400 of FIG. 4.

In block 502, a model of the fuel cell circuit may be stored in a memory. The model may be a physics-based model of the fuel cell circuit and may be created using any modeling environment such as Simulink™ or MatLab™, both available from MathWorks of Natick, Mass.

In block 504, a model processor may receive system requirements from an input device. The system requirements correspond to desirable operation of the fuel cell circuit. For example, the system requirements may include items such as limited or no overshoot of airflow through the fuel cell circuit, avoiding a stall condition and a surge condition, and the like. The system requirements received in block 504 may be provided as logic statements. For example, logic statements may be expressed using signal temporal logic (STL). The logic statements may be quantitative in nature.

System requirements may differ between on-paths and off-paths. An exemplary set of system requirements for on-paths may include the following: limited or no overshoot of airflow through the fuel cell stack, limited or no overshoot of airflow through the compressor, an airflow rate through the fuel cell stack should reach a target airflow rate (such as an airflow rate corresponding to a wide open throttle (WOT) condition) within a predetermined amount of time, a pressure ratio across the fuel cell stack should reach a target pressure ratio within a predetermined amount of time, an airflow rate through the fuel cell stack should stabilize to be within a relatively small margin of a target airflow rate, a total airflow rate through the compressor should stabilize to be within a relatively small margin of a target total airflow rate, and the pressure ratio across the fuel cell stack should stabilize to be within a relatively small margin of a target pressure ratio. The predetermined amount of time corresponds to an amount of time that is considered a sufficiently fast response time.

An exemplary set of system requirements for off-paths may include the following: no crossing of the surge line in the speed map, no crossing of the zero-slope line in the speed map, an airflow rate through the fuel cell stack should reach or drop below a target airflow rate within a predetermined amount of time, an airflow rate through the fuel cell stack should stabilize to be within a relatively small margin of a target airflow rate, a total airflow rate through the compressor should stabilize to be within a relatively small margin of a target total airflow rate, and the pressure ratio across the fuel cell stack should stabilize to be within a relatively small margin of a target pressure ratio.

Figure 6:
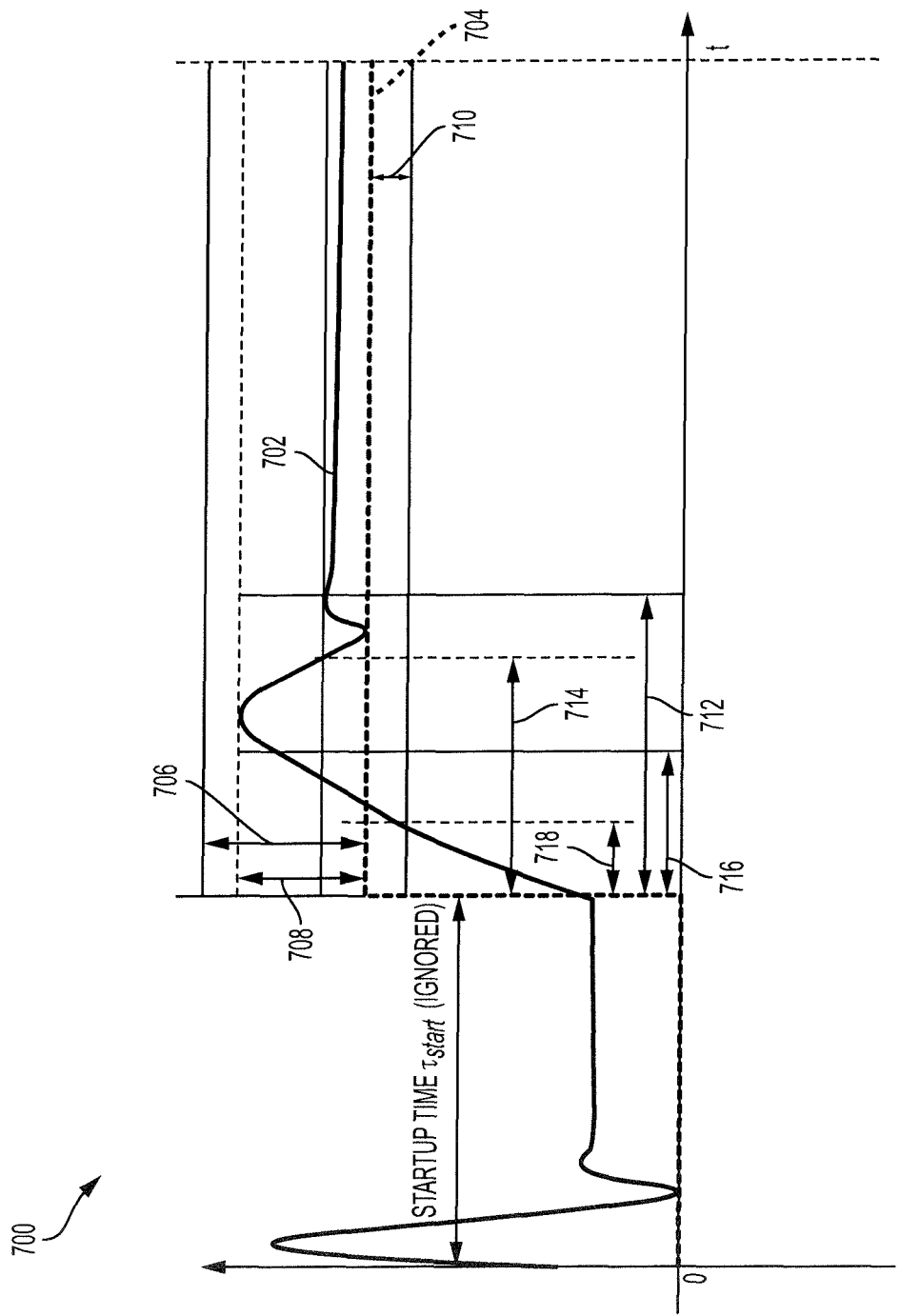
FIG. 6 is a graph illustrating exemplary output of a simulation using the method of FIGS. 5A and 5B along with system requirements of a fuel cell circuit according to an embodiment of the present invention.

Referring briefly to FIG. 6, a chart 700 illustrates an exemplary parameter, such as an airflow rate through a compressor, along with system requirements. A first line 702 illustrates the airflow rate over time, and a second line 704 illustrates a target airflow rate. The first system requirement may be that overshoot of the airflow rate be less than a predetermined level 706. The predetermined level 706 indicates acceptable overshoot values. As shown, the airflow rate illustrated by the first line 702 overshoots by an overshoot amount 708 that is less than the predetermined level 706.

Another system requirement may be that the airflow rate stabilizes within a tolerance level 710 after an amount of time 712. As shown, the airflow remains within the tolerance level 710 after the amount of time 712 has elapsed, and in fact settles to within the tolerance level 710 after a period of time 714.

Yet another system requirement may be that the airflow rate increase to at least within the tolerance level 710 of the target 704 within a desired response time 716. As shown, the airflow rate reaches within the tolerance level 710 within an actual response time 718 that is less than the desired response time 716. Thus, the airflow example illustrated in FIG. 6 satisfies each of the system requirements.

Returning reference to FIGS. 5A and 5B and in block 506, the model processor may receive system constraints from the input device. The system constraints may correspond to limits within which the actuator states selected by the model processor should remain, and may be provided as logic statements. In some embodiments, the system constraints may include limitations such as those corresponding to physical limitations of the actuators. For example, a system constraint may include a limitation that the valves may only open or close at a certain rate (such as 5 percent (5%) per millisecond), the compressor torque cannot exceed any physical torque limit of the compressor, or the like.

The system constraints may also include additional limitations selected by an operator. For example, the system constraints may include a limitation that a bypass valve should remain closed during all on-paths. Such a constraint does not correspond to a physical limitation of the bypass valve; however, the operator may provide such constraints to limit the test field based on available knowledge of the fuel cell circuit.

In block 508, the model processor may receive or determine an initial set of time-series actuator states. The initial set of time-series actuator states may be received from the input device, such as from a user, or may be determined by the model processor. For example, the model processor may be programmed to select a random set of time-series actuator states as the initial set, may be programmed to select a pre-provided set of time-series actuator states as the initial set, or the like.

The time-series actuator states may correspond to a progression of actuator states for each of the actuators over a period of time. For example and referring to FIG. 7, an exemplary set of time-series actuator states 600 for an on-path is shown. In particular, the set of time-series actuator states 600 includes a fuel cell current 602, a bypass valve position 604, a compressor torque request 606, and a restriction valve position 608. As shown, the set of time-series actuator states 600 includes a progression of actuator states over a period of time. For example, the compressor torque request 606 starts with a torque request of zero, increases after a first period of time, and decreases after a second period of time.

Returning reference to FIGS. 5A and 5B and in block 510, the model processor may perform a simulation of the model using the initial set of time-series actuator states that was received or determined in block 508. For example, the model processor may control each of the actuators based on the initial set of time-series actuator states during the simulation. The model processor may determine various parameters such as flow rates and pressure ratios corresponding to the various components of the fuel cell circuit during the simulation. The model processor may further store the various parameters as results of the simulation.

For example and referring again to FIG. 7, the model processor may determine a set of results 650 that indicate the parameters of the fuel cell circuit resulting from the simulation using the set of time-series actuator states 600. As shown, the set of results 650 includes a total airflow rate through the compressor 652, a pressure ratio across the compressor 654, an airflow rate through the fuel cell stack 656, and an airflow rate through the bypass branch. The model processor may analyze the set of results 650 to determine whether the set of results 650 satisfies the system requirements. If the set of results 650 satisfies the system requirements then the corresponding set of time-series actuator states 600 may be considered to be a good control of the fuel cell circuit.

Returning reference to FIGS. 5A and 5B and in block 512, the model processor may determine a robustness value of the initial set of time-series actuator states using signal temporal logic (STL). The model processor may utilize an STL monitor that implements STL by creating a formula or function that compares the results of the analysis to the system requirements. The STL monitor may use STL to compare the results and may output the robustness value as a normalized value based on the comparison. For example, the model processor may compute the robustness value as a normalized value based on the comparison using STL, the actuator input signals, and the actuator output signals. The robustness value indicates whether the results of the analysis satisfied the system requirements and how far apart the results and the system requirements are. Stated differently, a robustness value may refer to an estimated signed distance of a given time-series of actuator states from the set of time-series actuator states that satisfy a quantitative requirement.

Figure 7:
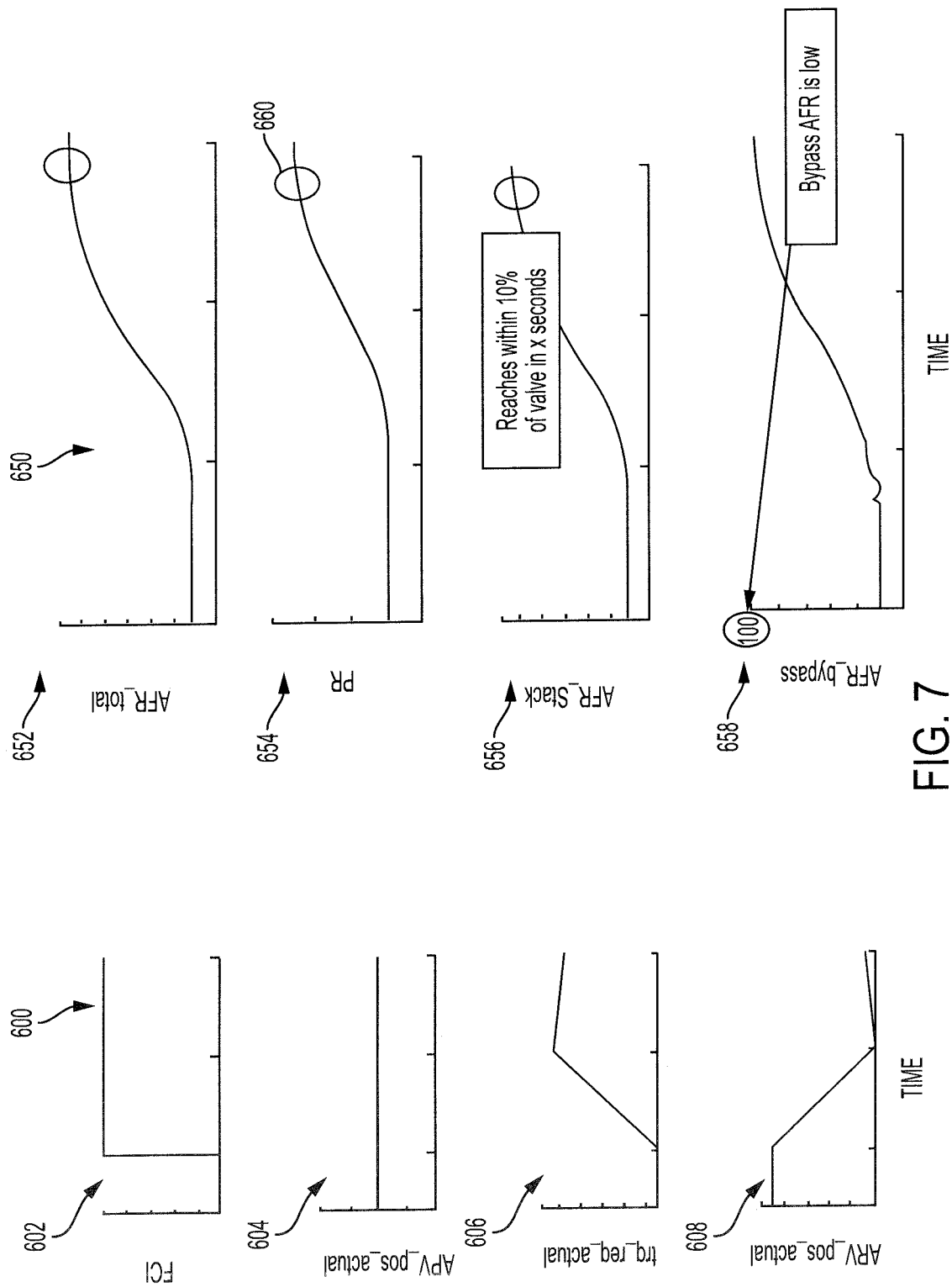
FIG. 7 illustrates an exemplary set of time-series actuator states along with results of a simulation using the time-series actuator states according to an embodiment of the present invention.

For example and referring to FIG. 7, a system requirement may be that the pressure ratio across the compressor reaches within ten percent (10%) of a target value within a predetermined amount of time. As shown, the fuel cell current 602 is increased at a time, corresponding to the time that the target pressure ratio is set. The results corresponding to the pressure ratio across the compressor 654 illustrate that a value 660 at a later time (but within the predetermined amount of time) is within ten percent (10%) of the target pressure ratio. Thus, the robustness value determined by the model processor may indicate that the initial set of time-series actuator states 600 satisfies the system requirements.

Continuing the example, if the pressure ratio values reached within 10% of the target value more quickly then the robustness value may be greater than the robustness value calculated based on the results 650. A first set of time-series actuator states with a higher robustness value may correspond to a better control of the actuators than a second set of time-series actuator states with a lower robustness value. Stated differently, higher (and in some embodiments positive) robustness values may indicate that the corresponding set of time-series actuator states provides optimal satisfactions of the system requirements. In some embodiments, the model processor may be designed to assign lower robustness values to better control of the actuators.

In some embodiments, the model processor may be designed to assign positive robustness values to sets of time-series actuator states that satisfied the system requirements, and negative robustness values to sets of time-series actuator states that failed to satisfy the system requirements.

Returning reference to FIGS. 5A and 5B and in block 514, the model processor may select a new set of time-series actuator states that is likely to provide improved results. In some embodiments, the model processor may randomly select a new set of time-series actuator states. For example, during a second iteration, the model processor may not have sufficient information to select a new set of time-series actuator states that is likely to provide improved results. However, during subsequent iterations, the model processor may have sufficient information to make such a selection.

For example, a first set of time-series actuator states may gradually ramp up the torque request over a two second period of time and may have a first robustness value. A second set of time-series actuator states may ramp up the torque request over a one second period of time and may have a second robustness value that is greater than the first robustness value. Assuming all other actuator control states remained constant from the first set the second set, the model processor may select a new set of time-series actuator states that causes the torque request to ramp up over a period of time that is less than one second. The model processor may make this selection based on the fact that the robustness value increased as the ramp up time of the compressor torque decreased.

In block 516, the model processor may perform a simulation of the model using the new set of time-series actuator states, and in block 518, may determine a robustness value of the new set of time-series actuator states using STL. The model processor may continue performing blocks 514 through 518 until a predetermined action occurs. The predetermined action may correspond to an action upon which, when completed, the method 500 should cease. For example, the model processor may continue performing blocks 514 through 518 for a predetermined period of time, or for a predetermined quantity of iterations. In some embodiments, the model processor may continue performing blocks 514 through 518 until a set of time-series actuator states is found that satisfies all of the system requirements.

In block 520, the model processor may select a final set of time-series actuator states based on the robustness values. For example, the model processor may select a final set of time-series actuator states that has the highest robustness value.

In block 522, the model processor may control an output device to output the final set of time-series actuator states. For example, the final set of time-series actuator states may be output on a display.

In block 524, the final set of time-series actuator states may be incorporated into an ECU of a vehicle to control a physical fuel cell circuit of the vehicle. Stated differently, the final set of time-series actuator states may define the desirable progression of the actuator states over time and may thus be used as control logic for the actuators.

In block 526, the previous blocks of the method 500 may be repeated for multiple on-paths and for multiple off-paths. For example and referring to FIG. 3, the model processor may identify a first on-path along the surge line 304, a second on-path along the stall line 306, and a third on-path along the midline 330. The model processor may further identify a first off-path along the surge line 304, a second off-path along the stall line 306, and a third off-path along the midline 330.

Figure 8:
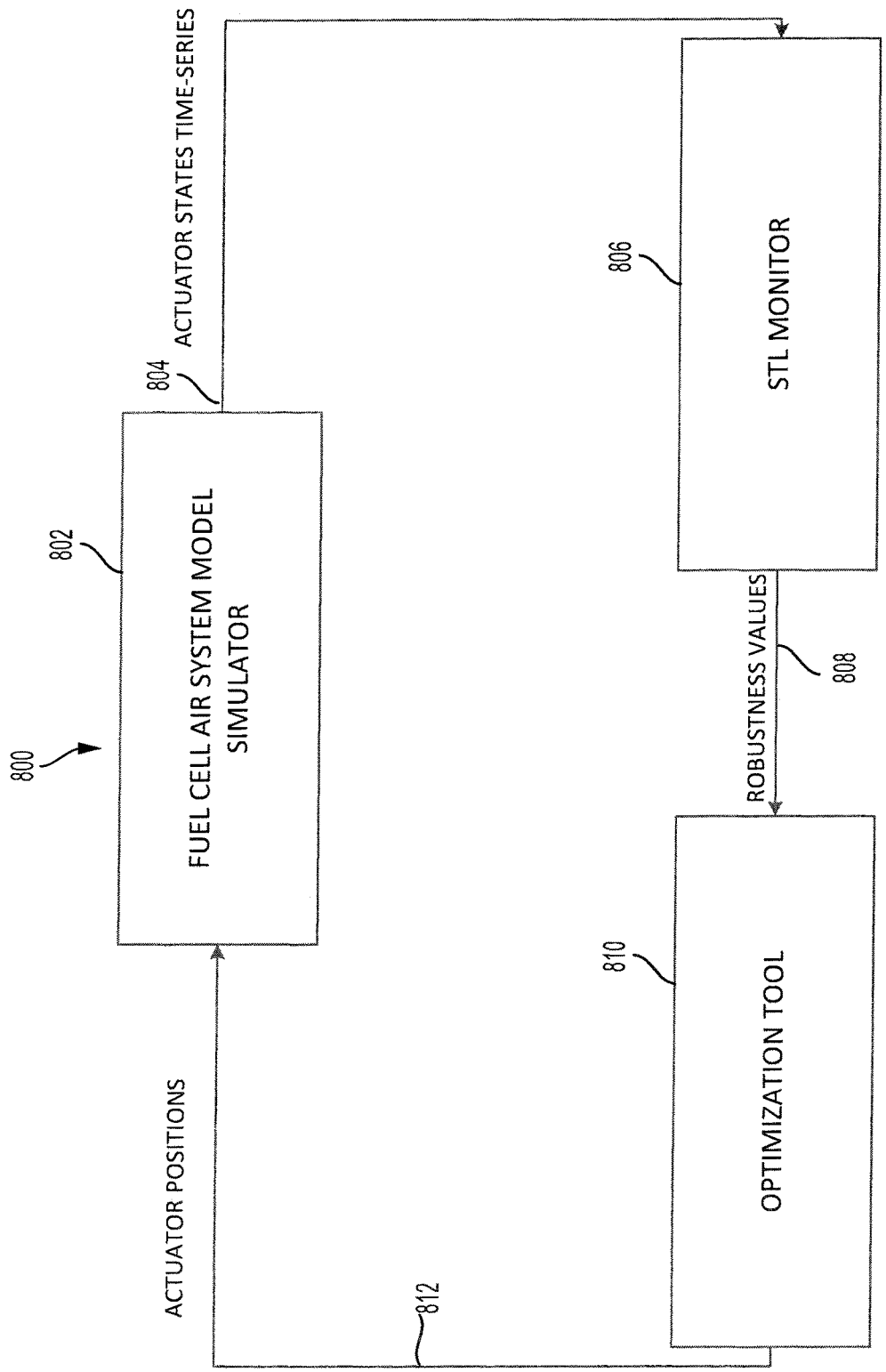
FIG. 8 is a flowchart illustrating a falsification routine to rank the potential time-series control solutions such that an optimal solution can be selected based on the rankings according to an embodiment of the present invention.

The model processor may use a falsification technique to rank the potential time-series control solutions such that an optimal solution can be selected based on the rankings. For example and referring to FIG. 8, a falsification routine 800 may be used to select an optimal solution. In block 802, the model processor may perform a simulation of the actuators using a simulation of the fuel cell circuit. The model processor may then output the time-series actuator states 804, which may be received by an STL monitor 806.

The STL monitor 806 may analyze the time-series actuator states 804 and determine and output robustness values 808 that correspond to the robustness values discussed above.

An optimization tool 810 may receive the robustness values 808 and may identify new actuator positions 812 (such as valve positions, motor torque, and the like) that may produce improved robustness values 808. Any known optimization tool 810 may be used.

In various embodiments, the falsification routine 800 may be performed for a predetermined quantity of iterations, or may be performed until the robustness values 808 reach a desired robustness threshold level corresponding to desirable operation of the fuel cell circuit.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for determining desired control paths for controlling operation of a fuel cell circuit, comprising:
   a memory configured to store a model of the fuel cell circuit including at least one actuator and a fuel cell stack;
   an input device configured to receive system requirements corresponding to desirable operation of the fuel cell circuit;
   an output device configured to output data; and
   a model processor coupled to the memory, the input device, and the output device, and configured to:
   select multiple sets of time-series actuator states corresponding to time-series control of the at least one actuator of the fuel cell circuit,
   perform simulations of the model using the multiple sets of time-series actuator states as controls for the at least one actuator,
   perform an analysis of results of the simulations to determine whether the results for each of the multiple sets of time-series actuator states satisfy the system requirements and how far the results are from the system requirements,
   select a final set of time-series actuator states that satisfy the system requirements based on the analysis of the results, and
   control the output device to output the final set of time-series actuator states.

2. The system of claim 1 wherein the model processor is configured to select new sets of the multiple sets of time-series actuator states by identifying the new sets that are likely to provide improved results based on previous results of previous simulations using a falsification technique.

3. The system of claim 1 wherein the at least one actuator include a compressor and two valves, and the multiple sets of time-series actuator states includes a compressor torque corresponding to torque applied by the compressor and valve positions corresponding to positions of the two valves.

4. The system of claim 1 wherein the at least one actuator includes a compressor, the time-series control of the compressor corresponds to an increase in compressor torque, and the system requirements include:
   limited or no overshoot of airflow through the fuel cell circuit;
   an airflow or pressure value of the fuel cell circuit reaching a target airflow or pressure value within a predetermined time period; and
   the airflow or pressure value of the fuel cell circuit stabilizing within a tolerance level of the target airflow or pressure value.

5. The system of claim 1 wherein the at least one actuator includes a compressor, the time-series control of the compressor corresponds to a decrease in compressor torque, and the system requirements include:
   no surge condition being experienced by the compressor;
   airflow through the fuel cell stack reducing to a predetermined airflow rate within a predetermined time period; and
   an airflow or pressure value of the fuel cell circuit stabilizing within a tolerance level of a target airflow or pressure value.

6. The system of claim 1 wherein the final set of time-series actuator states is configured to be used in an electronic control unit (ECU) of a vehicle to control operation of physical actuators of a physical fuel cell circuit.

7. The system of claim 1 wherein the input device is further configured to receive system constraints corresponding to limits within which the multiple sets of time-series actuator states should remain, and the model processor is further configured to select each of the multiple sets of time-series actuator states to remain within the system constraints.

8. The system of claim 7 wherein the model processor is further configured to select the multiple sets of time-series actuator states using an optimization tool.

9. The system of claim 1 wherein the input device is further configured to receive an initial set of time-series actuator states and the model processor is further configured to set the initial set of time-series actuator states as the first of the multiple sets of time-series actuator states.

10. The system of claim 1 wherein the model processor is further configured to determine robustness values indicating whether the results for each of the multiple sets of time-series actuator states satisfy the system requirements and how far the results are from the system requirements, and to select the final set of time-series actuator states by selecting a set of time-series actuator states having a maximum robustness value.

11. The system of claim 10 wherein the system requirements are provided as quantitative logic statements using signal temporal logic (STL), and the model processor is further configured to determine the robustness values by implementing a STL monitor that uses STL to calculate the robustness values by comparing the results to the logic statements.

12. A system for determining desired control paths for controlling operation of a fuel cell circuit, comprising:
   a memory configured to store a model of the fuel cell circuit including at least one actuator and a fuel cell stack;
   an input device configured to receive system requirements corresponding to desirable operation of the fuel cell circuit; and
   a model processor coupled to the memory and the input device and configured to:
      select multiple sets of time-series actuator states corresponding to time-series control of the at least one actuator of the fuel cell circuit,
      perform simulations of the model using the multiple sets of time-series actuator states as controls for the at least one actuator,
      perform an analysis of results of the simulations to determine robustness values for each of the simulations indicating whether the results for each of the multiple sets of time-series actuator states satisfy the system requirements and how far the results are from the system requirements, and
      select a final set of time-series actuator states that satisfy the system requirements based on the robustness values.

13. The system of claim 12 wherein the model processor is configured to select new sets of the multiple sets of time-series actuator states by identifying the new sets that are likely to provide improved results based on previous results of previous simulations using a falsification technique.

14. The system of claim 12 wherein the at least one actuator include a compressor and two valves, and the multiple sets of time-series actuator states includes a compressor torque corresponding to torque applied by the compressor and valve positions corresponding to positions of the two valves.

15. The system of claim 12 wherein:
   the input device is further configured to receive system constraints corresponding to limits within which the multiple sets of time-series actuator states should remain;
   at least some of the system constraints correspond to physical limitations of the at least one actuator of the fuel cell circuit; and
   the model processor is further configured to select each of the multiple sets of time-series actuator states to remain within the system constraints.

16. A method for determining desired control paths for controlling operation of a fuel cell circuit, comprising:
   storing, in a memory, a model of the fuel cell circuit including at least one actuator and a fuel cell stack;
   receiving, by an input device, system requirements corresponding to desirable operation of the fuel cell circuit;
   selecting, by a model processor, multiple sets of time-series actuator states corresponding to time-series control of the at least one actuator of the fuel cell circuit;
   performing, by the model processor, simulations of the model using the multiple sets of time-series actuator states as controls for the at least one actuator;
   performing, by the model processor, an analysis of results of the simulations to determine whether the results for each of the multiple sets of time-series actuator states satisfy the system requirements and how far the results are from the system requirements; and
   selecting, by the model processor, a final set of time-series actuator states that satisfy the system requirements based on the analysis of the results.

17. The method of claim 16 further comprising programming an electronic control unit (ECU) of a vehicle with the final set of time-series actuator states in order to control operation of physical actuators of a physical fuel cell circuit.

18. The method of claim 16 further comprising selecting new sets of the multiple sets of time-series actuator states by identifying the new sets that are likely to provide improved robustness values using a falsification technique.

19. The method of claim 16 wherein the at least one actuator include a compressor and two valves, and the multiple sets of time-series actuator states includes a compressor torque corresponding to torque applied by the compressor and valve positions corresponding to positions of the two valves.

20. The method of claim 16, wherein at least one of:
   the at least one actuator includes a compressor, the time-series control of the compressor corresponds to an increase in compressor torque, and the system requirements include:
      limited or no overshoot of airflow through the fuel cell circuit,
      an airflow or pressure value of the fuel cell circuit reaching a target airflow or pressure value within a predetermined time period, and
      the airflow or pressure value of the fuel cell circuit stabilizing within a tolerance level of the target airflow or pressure value, or
   the at least one actuator includes the compressor, the time-series control of the compressor corresponds to a decrease in compressor torque, and the system requirements include:
      no surge condition being experienced by the compressor,
      airflow through the fuel cell stack reducing to a predetermined airflow rate within a predetermined time period, and
      an airflow or pressure value of the fuel cell circuit stabilizing within a tolerance level of a target airflow or pressure value.

* * * * *